United States Patent
Ron et al.

(10) Patent No.: US 9,521,670 B2
(45) Date of Patent: Dec. 13, 2016

(54) SIGNAL DECODING IN THE PRESENCE OF ALMOST-BLANK SUBFRAMES (ABS)

(71) Applicant: Marvell World Trade Ltd., St. Michael (BB)

(72) Inventors: Roy Ron, Tel Aviv (IL); Ronen Mayrench, Ra'anana (IL); Yona Perets, Ra'anana (IL)

(73) Assignee: Marvell World Trade Ltd., St. Michael (BB)

( * ) Notice: Subject to any disclaimer, the term of this patent is extended or adjusted under 35 U.S.C. 154(b) by 186 days.

(21) Appl. No.: 14/194,741

(22) Filed: Mar. 2, 2014

(65) Prior Publication Data

US 2014/0254512 A1 Sep. 11, 2014

Related U.S. Application Data

(60) Provisional application No. 61/772,983, filed on Mar. 5, 2013, provisional application No. 61/830,581, filed on Jun. 3, 2013.

(51) Int. Cl.
*H04L 1/20* (2006.01)
*H04W 72/04* (2009.01)
*H04B 17/354* (2015.01)
*H04L 25/02* (2006.01)

(52) U.S. Cl.
CPC ............ *H04W 72/0446* (2013.01); *H04L 1/20* (2013.01); *H04B 17/354* (2015.01); *H04L 25/0202* (2013.01)

(58) Field of Classification Search
CPC ...... H04B 17/354; H04L 1/20; H04L 25/0202; H04W 52/244; H04W 72/0446
USPC .......................................................... 370/329
See application file for complete search history.

(56) References Cited

U.S. PATENT DOCUMENTS

| | | |
|---|---|---|
| 2007/0153731 A1 | 7/2007 | Fine |
| 2008/0192852 A1 | 8/2008 | Kent et al. |
| 2009/0161605 A1 | 6/2009 | Shen et al. |
| 2009/0180561 A1 | 7/2009 | Kim et al. |
| 2011/0110450 A1 | 5/2011 | Gomadam et al. |
| 2013/0017793 A1* | 1/2013 | Henttonen ............ H04W 52/52 455/63.1 |
| 2013/0107785 A1* | 5/2013 | Bhattad .................. H04J 11/005 370/312 |
| 2013/0223258 A1* | 8/2013 | Seo ........................ H04W 24/02 370/252 |

(Continued)

OTHER PUBLICATIONS

Kamel et al., "Performance Evaluation of a Coordinated Time-Domain eICIC Framework based on ABSF in Heterogeneous LTE-Advanced Networks", IEEE 2012 Global Communications Conference (GLOBECOM), pp. 5326-5331, Dec. 3-7, 2012.

(Continued)

*Primary Examiner* — Mohammad Anwar
*Assistant Examiner* — Kokou R Detse

(57) ABSTRACT

A method includes, in a mobile communication terminal, receiving signals from a base station in a sequence of time frames. Based on the received signals, a classification of the time frames into first and second types is determined in the terminal, such that a level of interference in the time frames of the first type is lower than the level of interference in the time frames of the second type. The received signals are decoded based on the time frames and the corresponding classification.

14 Claims, 2 Drawing Sheets

(56) References Cited

U.S. PATENT DOCUMENTS

| | | | | |
|---|---|---|---|---|
| 2013/0223271 A1* | 8/2013 | Huang | ............... | H04W 48/16 370/252 |
| 2013/0294281 A1* | 11/2013 | Lee | ............... | H04W 24/10 370/252 |
| 2013/0303153 A1* | 11/2013 | Bontu | ............... | H04L 1/0026 455/423 |
| 2013/0315192 A1* | 11/2013 | Seo | ............... | H04W 72/04 370/329 |
| 2014/0198678 A1* | 7/2014 | Kim | ............... | H04W 24/06 370/252 |
| 2014/0286291 A1* | 9/2014 | Einhaus | ............... | H04B 7/024 370/329 |

OTHER PUBLICATIONS

Zhang et al., U.S. Appl. No. 13/409,130, filed Mar. 1, 2012.
Ericsson, "On Data Channel Performance with Cell Range Expansion and Non-Full Buffer Traffic", 3GPP TSG RAN WG1 Meeting # 62Bis, Xian, China, Oct. 11-15, 2010.
Qualcomm Incorporated, "Improving Control Reliability in Severe Interference Conditions", 3GPP TSG RAN WG1 #61bis, Dresden, Germany, Jun. 28-Jul. 2, 2010.
Qualcomm Incorporated, "Analysis of Solutions to Improve Control Reliability in Severe Interference Conditions", 3GPP TSG RAN WG1 #62, Madrid, Spain, Aug. 23-27, 2010.
3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", section 16.1.5, 209 pages, V11.7.0 (Sep. 2013).
U.S. Appl. No. 13/409,130 Office Action dated Nov. 29, 2013.
U.S. Appl. No. 13/409,130 Office Action dated Aug. 30, 2013.

* cited by examiner

US 9,521,670 B2

SIGNAL DECODING IN THE PRESENCE OF ALMOST-BLANK SUBFRAMES (ABS)

CROSS-REFERENCE TO RELATED APPLICATIONS

This application claims the benefit of U.S. Provisional Patent Application 61/772,983, filed Mar. 5, 2013, and U.S. Provisional Patent Application 61/830,581, filed Jun. 3, 2013, whose disclosures are incorporated herein by reference.

FIELD OF THE DISCLOSURE

The present disclosure relates generally to communication systems, and particularly to methods and systems for decoding in the presence of almost-blank subframes.

BACKGROUND

Some cellular networks comprise multiple layers of cells of different classes, e.g., macro cells, microcells, picocells and/or femtocells. Such networks are sometimes referred to as heterogeneous networks. The multi-layer network structure affects the interference experienced by communication terminals. Several techniques are known in the art for reducing interference in heterogeneous networks.

For example, 3GPP Technical Specification Group Radio Access Network (TSG-RAN) WG1 document R1-103561, entitled "Improving Control Reliability in Severe Interference Conditions," Dresden, Germany, Jun. 28-Jul. 2, 2010, which is incorporated herein by reference, describes Time Division Multiplexing (TDM) scheduling schemes for improving the reliability of downlink control channels using sub-frame partitioning. TDM scheduling schemes of this sort are further analyzed in TSG-RAN WG1 document R1-104817, entitled "Analysis of Solutions to Improve Control Reliability in Severe Interference Conditions," Madrid, Spain, August 23-27, which is incorporated herein by reference. Example TDM scheduling patterns for heterogeneous networks are also proposed in TSG-RAN WG1 document R1-105336, entitled "On Data Channel Performance with Cell Range Expansion and Non-Full Buffer Traffic," which is incorporated herein by reference.

As another example, techniques for reducing interference by inter-cell interference coordination (ICIC) are described, for example, in section 16.1.5 of 3GPP Technical Specification TS 36.300, entitled "Group Radio Access Network; Evolved Universal Terrestrial Radio Access (E-UTRA) and Evolved Universal Terrestrial Radio Access Network (E-UTRAN); Overall description," (3GPP TS 36.300, version 11.7.0, Release 11), September, 2013, which is incorporated herein by reference.

The description above is presented as a general overview of related art in this field and should not be construed as an admission that any of the information it contains constitutes prior art against the present patent application.

SUMMARY

An embodiment that is described herein provides a method including, in a mobile communication terminal, receiving signals from a base station in a sequence of time frames. Based on the received signals, a classification of the time frames into first and second types is determined in the terminal, such that a level of interference in the time frames of the first type is lower than the level of interference in the time frames of the second type. The received signals are decoded based on the time frames and the corresponding classification.

In some embodiments, receiving the signals includes receiving signaling that defines time-frame patterns corresponding to the first and second types, and determining the classification includes identifying which of the time-frame patterns includes the time frames of the first type and which of the time-frame patterns includes the time frames of the second type. In other embodiments, determining the classification includes identifying that none of the patterns includes the time frames of the first or second type. In yet other embodiments, the time frames alternate between the first type and the second type in a periodic pattern, and determining the classification includes averaging noise in the received signals over multiple periods of the periodic pattern, and determining the classification based on the averaged noise.

In an embodiment, decoding the received signals includes estimating a parameter of the received signals while applying different weights to the time frames of the first type and to the time frames of the second type, and decoding the signals using the estimated parameter. In another embodiment, applying the different weights includes applying to the time frames of the first type first weights, and applying to the time frames of the second type second weights that are smaller than the first weights. In yet another embodiment, applying the different weights includes estimating the parameter using only the time frames of the first type.

In some embodiments, estimating the parameter includes estimating at least one parameter selected from a group of parameters including a response of a channel carrying the signals, a timing of the signals, a frequency of the signals and a gain of the signals. In other embodiments, decoding the signals includes: upon successfully determining the classification, estimating a response of a channel carrying the signals by averaging the signals over multiple time frames; upon failing to determine the classification, estimating the response of the channel individually per time frame; and decoding the signals using the estimated response of the channel.

In an embodiment, determining the classification further includes determining that the time frames cannot be classified into the first and second types, and decoding the received signals is not based on the classification.

There is additionally provided, in accordance with an embodiment that is described herein, apparatus including a receiver and processing circuitry. The receiver is configured to receive downlink signals from a base station in a sequence of time frames. The processing circuitry is configured to determine a classification of the time frames into first and second types based on the received signals, such that a level of interference in the time frames of the first type is lower than the level of interference in the time frames of the second type, and to decode the received signals based on the time frames and the corresponding classification.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
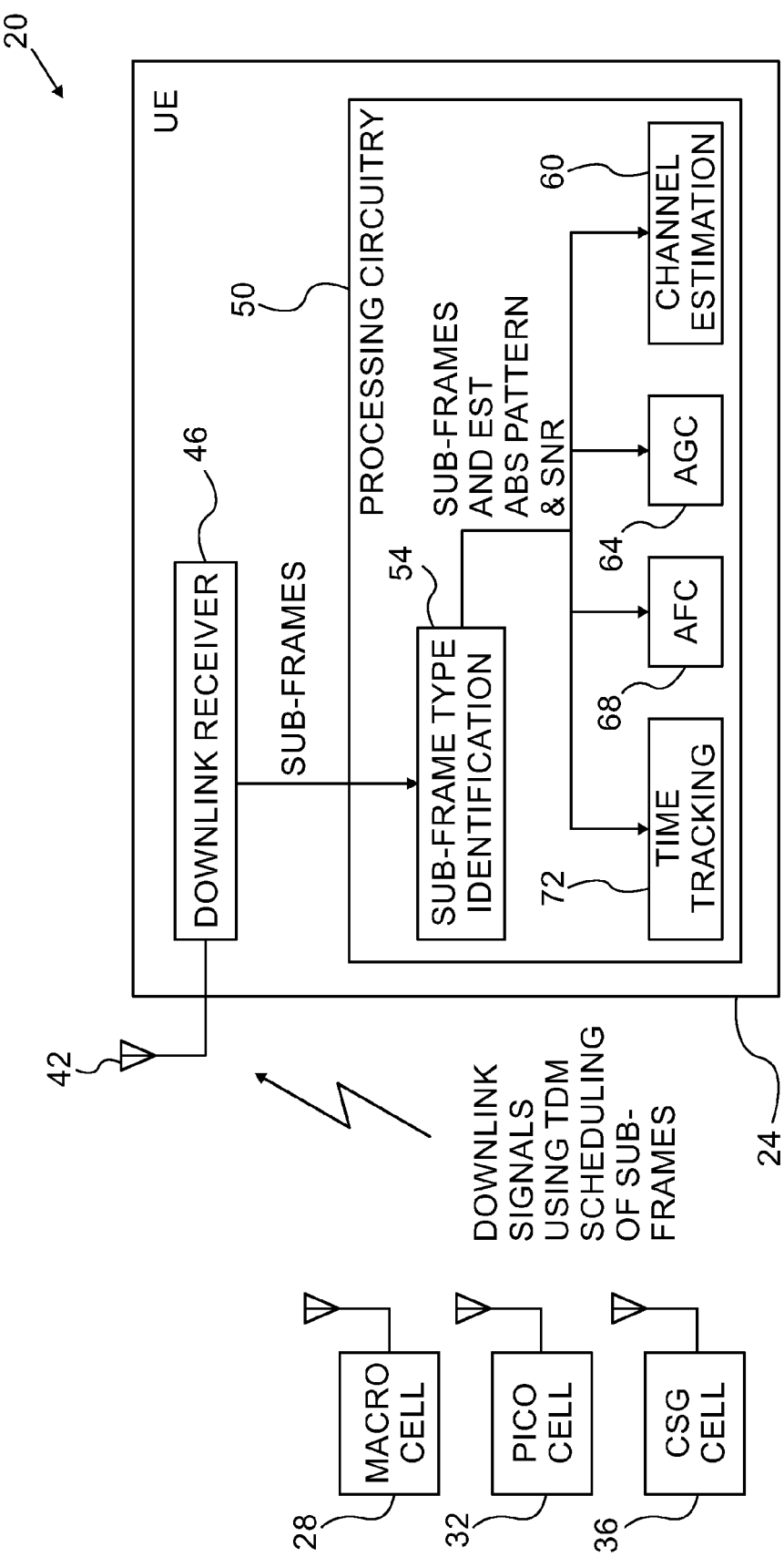
FIG. 1 is a block diagram that schematically illustrates a mobile communication terminal operating in a heterogeneous wireless communication network, in accordance with an embodiment that is described herein.

A heterogeneous cellular network typically comprises multiple cells of different classes, e.g., macro-cells, micro-cells, pico-cells and/or femto-cells, which are deployed in a certain geographical area. Micro-cells, pico-cells and femto-cells are sometimes referred to collectively as Low-Power Nodes (LPN). Each class of cells, typically defined by a range of transmit power levels, is referred to as a layer.

A mobile communication terminal operating in a heterogeneous network may encounter severe interference, which is caused or intensified by the layered structure of the network. For example, a femto-cell that serves a Closed Subscription Group (CSG) may cause severe interference to a nearby terminal that does not belong to the CSG and is served by a distant macro-cell. As another example, a macro-cell may cause severe interference to a terminal served by a nearby pico-cell.

Some heterogeneous networks reduce the interference to mobile communication terminals by applying Time Division Multiplexing (TDM) scheduling among the downlink transmissions of different layers. TDM scheduling is specified, for example, for use in enhanced Inter-Cell Interference Cancellation (eICIC) in Release 10 Long Term Evolution (LTE) networks.

In a typical TDM scheduling scheme, at least one of the layers of cells (or a subset of one or more cells in that layer) transmits an alternating pattern of sub-frames of which some are referred to as Almost Blank Sub-frames (ABSs). The ABSs contain little or no data, while the other sub-frames (referred to herein as non-ABS) contain data normally. The alternating pattern is also referred to herein as an ABS pattern. Transmission of ABSs in a given layer enables terminals served by another layer to receive downlink signals with reduced interference. (The term "sub-frames" is used in the present description and in the claims to denote time intervals, in accordance with accepted usage in LTE standards.) In the description that follows the term "sub-frame type" refers to the classification of the sub-frame being scheduled as an ABS or non-ABS.

Embodiments that are described herein provide improved methods and systems for communication in heterogeneous networks that use TDM scheduling. In the disclosed embodiments, a mobile communication terminal receives downlink signals from its serving cell and possibly from other cells, and extracts from the signals a sequence of sub-frames.

Some of the embodiments described herein refer to a heterogeneous network having a layered structure. The disclosed techniques, however, are not limited to this sort of application, and can be used in various other networks in which cells of a certain type suffer interference from cells of another type.

The terminal comprises processing circuitry for decoding the received signals. In an embodiment, the processing circuitry is configured to classify the sub-frames into one of the two sub-frame types, i.e., ABSs or non-ABSs. The classification results are used in various receiver processing tasks such as Channel Estimation (CE), Automatic Gain Control (AGC), Automatic Frequency Control (AFC) and/or time tracking and synchronization. Since non-ABSs typically contain significantly higher interference levels than ABSs, processing and estimation operations that relate to the decoding are improved by giving lower weight to non-ABSs.

In an embodiment, to coordinate transmission in sub-frames that suffer interference, the network sends to the terminal an ABS pattern of a given length. The ABS pattern defines the locations of the sub-frames that correspond to one of the two sub-frame types, whereas the other (i.e., the complementary) locations correspond to the opposite sub-frame type. The terminal, however, has no a-priori knowledge as to which of the ABS or non-ABS sub-frame type the pattern locations correspond.

In some embodiments, the processing circuitry processes the received sub-frames to decide among three hypotheses. Two of the hypotheses define the ABS type of the locations of the ABS pattern, i.e., ABS or non-ABS respectively. The third hypothesis assumes a configuration in which transmission of ABSs is disabled, and therefore no functionality that relates to ABSs is needed at the UE.

In an embodiment, the processing circuitry sums the noise over the pattern locations, sums the noise separately over the complementary locations, and calculates a noise-ratio between the two noise sums. Three decision zones, corresponding to the three hypotheses, are defined over the range of possible noise-ratio values. The processing circuitry selects the most likely hypothesis based on the decision zone in which the noise-ratio falls. The sub-frames are then classified based on the selected ABS pattern. In alternative embodiments, the number of ABS patterns is NP>2 and the respective number of hypotheses is NP+1.

In other embodiments, the terminal operates under the assumption that ABSs are in use, but it has no a-priori knowledge of the actual ABS pattern. The processing circuitry calculates, per sub-frame, a long term average noise (or interference) level over multiple ABS pattern cycles. The processing circuitry then calculates a sub-frame-specific noise-ratio between the sub-frame noise level and the maximal noise level among all the sub-frames. The processing circuitry classifies the sub-frames by comparing the sub-frame-specific noise-ratio to a predefined threshold, so that a ratio above or below the threshold correspond to non-ABS or ABS sub-frame type, respectively.

In some embodiments, the processing circuitry additionally calculates the Signal to Noise Ratio (SNR) for each of the classified ABSs and non-ABSs, and/or an average SNR over the ABSs. The classification information and the calculated SNRs are used to improve the CE as described below.

Some of the processing operations the terminal performs are sensitive to the noise and/or interference level. For example, in CE processing, the processing circuitry typically performs averaging of pilot signals over sub-frames that may contain a high level of interference and therefore may bias or distort the averaging result.

In an embodiment, when the sub-frame classification succeeds, the processing circuitry performs CE by averaging the pilot signals only in the sub-frames classified as ABSs. When the sub-frames cannot be classified, the CE averages the pilot signals over all the sub-frames. In some embodiments, even when the sub-frames can be classified, the decision whether to average only over the ABSs or over all the sub-frames further depends on the SNR of the classified sub-frames. In an embodiment, the processing circuitry restricts the averaging operation to include only the ABSs only when the average SNR of the ABSs exceeds a predefined threshold. Such conditioned restriction improves the performance of the CE at low SNRs, in which averaging over a larger number of sub-frames results in a more accurate estimation than averaging only over the ABSs.

In some embodiments, instead of including or excluding sub-frames from the CE processing, the processing circuitry assigns soft weights to the sub-frames. The weights may be indicative, for example, of the noise level in each sub-frame. In such embodiments, the processing circuitry performs CE by calculating a weighted average of the pilot signals using the assigned weights. In an example embodiment, the assigned weights depend on the sub-frame-specific SNR, so that higher weights are assigned to sub-frames of higher SNRs.

In the disclosed techniques, the processing circuitry identities the type of each received sub-frame as ABS or non-ABS. By giving smaller (or zero) weight to sub-frames that suffer higher interference levels (i.e., non-ABSs) the accuracy of various processing and estimation procedures improves significantly.

FIG. 1 is a block diagram that schematically illustrates a mobile communications terminal 24 operating in a heterogeneous wireless communication network 20, in accordance with an embodiment that is described herein. In the present example, network 20 comprises a cellular network that operates in accordance with the Long Term Evolution (LTE) specifications. In alternative embodiments, network 20 may operate in accordance with any other suitable communication standard or protocol that supports TDM scheduling.

In the example of FIG. 1, network 20 comprises mobile communication terminal 24 (referred to in LTE terminology as User Equipment—UE), a macro-cell 28, a pico-cell 32, and a CSG-cell 36. This choice is made, however, purely by way of illustrative example. In real-life configurations, network 20 typically comprises a large number of cells of various types and a large number of terminals. Terminal 24 may comprise, for example, a cellular phone, a wireless-enabled computing device or any other suitable type of communication terminal.

Network 20 is a heterogeneous network, in which the cells are arranged in layers, such that each layer comprises the cells of a certain transmit power class. In an example embodiment, one layer comprises high-power macro cells, and the other layer comprises a given type of Low-Power Nodes (LPNs) such as Remote Radio Heads (RRHs), relay nodes, micro-cells, pico-cells and/or femto-cells. Different types of LPNs typically have different transmit power levels, and a given layer is typically made-up of a single type of LPNs. For example, pico-cells and femto-cells are typically not included in the same layer.

At a given time, terminal 24 is served by one of the cells in network 20, e.g., either by macro-cell 28, by pico-cell 32, or by CSG-cell 36. This cell is referred to as the serving cell of the terminal. In order to reduce interference, network 20 applies TDM scheduling between cells that belong to different layers, in an embodiment. An example TDM scheduling pattern is described in FIG. 2 below. In some embodiments, network comprises one or more controller nodes (not seen in the figure) that control the communication between the cells and provide various other network services such as scheduling services.

In the present embodiment, terminal 24 comprises at least one antenna 42 for receiving Radio Frequency (RF) downlink signals from the cells and for transmitting RF uplink signals to the cells. A downlink receiver 46 receives the RF downlink signals via antenna 42, down-converts the signals, and extracts downlink data from the signals. In the present example, the downlink signal comprises a sequence of multiple sub-frames.

Terminal 24 further comprises processing circuitry 50, which performs the various digital and baseband processing tasks of the terminal. Among other tasks, the processing circuitry estimates the conditions on the downlink communication channel between the serving cell and terminal 24 based at least on the received downlink signals.

In the example of FIG. 1, processing circuitry 50 comprises a sub-frame type identification unit 54 that identifies which of the received downlink sub-frames comprise ABSs and which comprise non-ABSs. In some embodiments, unit 54 additionally recognizes whether transmission of ABSs is used or not.

In some embodiments, sub-frame type identification unit 54 identifies the type of the sub-frames (i.e., ABS or non-ABS) automatically based on the received downlink signals, regardless of prior information as to the TDM scheduling pattern. In other embodiments, unit 54 is notified (e.g., by the serving cell) of the TDM scheduling pattern and of the locations of the ABSs and the non-ABSs within the pattern.

In various embodiments, one or more modules within processing circuitry 50 are configured to process the received sub-frames as part of the UE decoding. These modules include, for example, a Channel Estimation (CE) unit 60, an Automatic Gain Control (AGC) unit 64, an Automatic Frequency Control (AFC) unit 68, and a time tracking unit 72. These modules are collectively referred to herein as decoding modules. CE unit 60 estimates the response of the communication channel between the serving cell and the UE. AGC unit 64 controls the amplitude of the received signals. AFC unit and time tracking unit 72 control the respective frequency and time synchronization of the received signals.

The processing performed by the decoding modules is typically sensitive to the level of noise and/or interference in the received signals. The performance of the decoding modules typically degrades in the presence of high noise or interference level. The classification of the received sub-frames (e.g., by unit 54) into ABSs and non-ABSs enables the decoding modules to process the sub-frames while giving reduced (or zero) weight to highly interfered sub-frames, thus enhancing the performance of these modules.

The terminal and network configurations shown in FIG. 1 are example configurations, which are depicted in a highly simplified manner solely for the sake of clarity. In alternative embodiments, any other suitable terminal and network configurations can be used. Terminal and network elements that are not mandatory for understanding of the disclosed techniques have been omitted from the figure for the sake of clarity.

In various embodiments, some or all of the elements of terminal 24, including receiver 46 and processing circuitry 50, are implemented in hardware, such as implementing elements of the receiver using one or more Radio Frequency Integrated Circuits (RFICs), or implementing the processing circuitry using one or more Field-Programmable Gate Arrays (FPGAs) or Application-Specific Integrated Circuits (ASICs). In alternative embodiments, certain elements of terminal 24 are implemented in software, or using a combination of hardware and software elements.

In some embodiments, certain terminal elements, such as certain elements of processing circuitry 50, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

Figure 2:
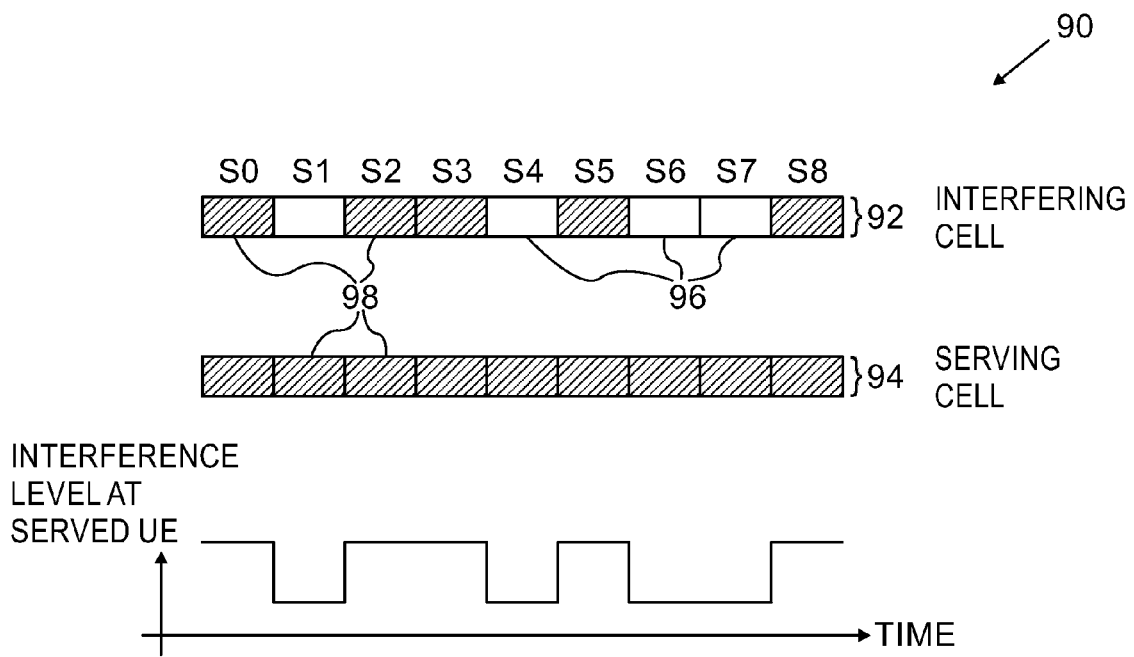
FIG. 2 is a diagram that schematically illustrates a Time Division Multiplexing (TDM) scheduling pattern used in a heterogeneous wireless communication network, in accordance with an embodiment that is described herein.

FIG. 2 is a diagram that schematically illustrates a TDM scheduling pattern 90 used in a heterogeneous wireless communication network, in accordance with an embodiment that is described herein. In the example of FIG. 2, the network comprises an LTE network having two layers—A layer of macro-cells and a layer of pico-cells. In alternative embodiments, any other suitable number of layers can be used. In the present example, terminal 24 is served by a pico-cell, which is positioned in the vicinity of one or more (possibly interfering) macro-cells.

A pattern 90 comprises a period of nine time-domain LTE downlink sub-frames denoted S0 . . . S8, which is repeated cyclically in the time domain. In an embodiment, the macro cells transmit downlink sub-frames in accordance with a pattern 92 shown at the top of the figure, and the serving pico-cell transmits downlink sub-frames in accordance with a pattern 94 shown at the middle of the figure. The macro-cells and the pico-cell are assumed to be time-synchronized, i.e., the beginning of each pattern cycle and the boundaries between sub-frames occur simultaneously across the network.

In alternative embodiments a macro-cell is serving terminal 24, which is not assigned to the served group of a nearby CSG-cell. The serving macro-cell and the (possibly interfering) CSG-cell transmit sub-frames according to respective patterns 94 and 92.

Pattern 90 comprises data-carrying sub-frames 98 (shaded in the figure) that carry data transmissions to terminals, and sub-frames referred to as Almost Blank Sub-frames (ABSs) 96 that do not contain data transmissions (but may contain other signals such as synchronization and reference signals). In the example of FIG. 2, during sub-frames S1, S4, S6, and S7, the macro-cells are not permitted to transmit data to the terminals they serve, and may only transmit ABSs. During sub-frames S0, S2, S3, S5, and S8, the macro-cells are permitted to transmit data, and these sub-frames are referred to as non-ABSs. In the present example, the serving pico-cell (as well as other pico-cells in the layer) is permitted to transmit data during the entire pattern 94.

During ABSs, the pico-cell transmits data while the macro-cells transmit ABSs. During non-ABSs, both the macro-cells and the serving pico-cell are permitted to transmit data. From the perspective of the served terminal, during non-ABSs the terminal may encounter high interference from the transmissions of the macro-cells.

To summarize, the signals received in the served terminal comprise signals transmitted by its serving cell and possibly interfering signals from other cells. The interference received during ABSs is typically significantly lower than during non-ABSs.

The lowest part of FIG. 2 depicts the interference level at the receiver of the served terminal. As can be seen, the interference level is low during the transmission of the ABSs, and high during the transmission of the non-ABSs.

The TDM scheduling pattern of FIG. 2 is shown solely by way of example. In alternative embodiments, any other suitable pattern can be used. The pattern may involve any desired number of layers, with each layer using any desired pattern of data-carrying sub-frames 98 and ABSs 96. In some embodiments, a given layer comprises only data-carrying sub-frames and no ABSs.

Figure 3:
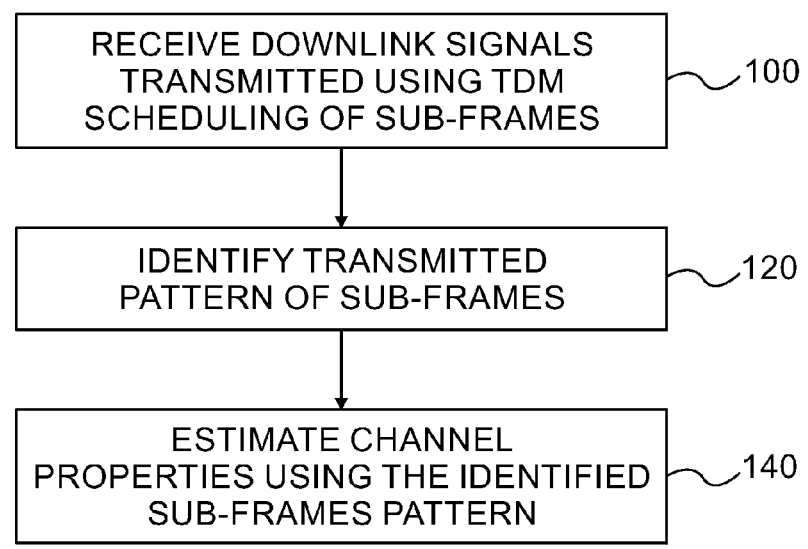
FIG. 3 is a flow chart that schematically illustrates a method for channel estimation in a heterogeneous wireless communication network, in accordance with an embodiment that is described herein.

FIG. 3 is a flow chart that schematically illustrates a method for channel estimation in network 20, in accordance with an embodiment that is described herein. The method begins with downlink receiver 46 of terminal 24 receiving downlink signals from the cells of network 20, at a downlink reception operation 100. Downlink receiver 46 processes the received signals and outputs a sequence of sub-frames to sub-frame type identification unit 54. Unit 54 identifies whether an ABS pattern is in use, and the type (i.e., ABS or non-ABS) of each received sub-frame, at a classification operation 120. Several classification methods that unit 54 can use are discussed further below, although any other suitable classification methods can also be used.

At a channel estimation operation 140, channel estimation unit 60 estimates the response of the channel between UE 24 and its serving cell. By giving higher weights to sub-frames that unit 54 identifies as ABSs (i.e., sub-frames that suffer lower interference), unit 60 achieves accurate estimations. Example methods for improved CE are described in detail further below. Alternatively, other suitable CE methods can also be used.

Although the description of the method of FIG. 3 focuses on CE (e.g., as processed in unit 60), the method is similarly applicable to other decoding modules within UE 24. For example, the disclosed techniques can be also applied to any UE module whose processing outcome may be affected by the noise and/or interference level in the received sub-frames. Such modules include, for example, AGC unit 64, AFC unit 68, and time tracking unit 72.

The description that follows outlines several classification methods that can be used, for example, by unit 54 at operation 120 in the method of FIG. 3 above. In some embodiments, when a given cell (or layer) is enabled to transmit ABSs, network 20 notifies the cell (e.g., using downlink signaling) of the ABS pattern in use.

In some embodiments, an ABS pattern comprises a binary sequence in which the '1' and '0' bits correspond to time-domain sub-frames. For example, the locations in which the '1' bits appear refer to ABSs (or non-ABSs) and the locations of the '0' bits refer to non-ABSs (or ABSs). UE 24, however has no a-priori knowledge of whether the '1' bits correspond to ABSs and the '0' bits correspond to non-ABSs, or vice-versa. The cells that are configured to schedule transmission according the ABS pattern repeat the pattern transmission periodically.

As an example, the binary sequence '010010110' (or its inverse '101101001') can be used to signal ABS pattern 92 in FIG. 2 to UE 24 (although any other suitable pattern can be used in alternative embodiments). As another example, the LTE specifications specify a 40-bit pattern for Channel State Information (CSI) measurements. In this pattern, the subset of sub-frames indicated by the '0' bits is referred to as CSI-0, and the subset of sub-frames indicated by the '1' bits is referred to as CSI-1. The UE is required to measure and report CSI separately on the CSI-0 and CSI-1 sub-frames, but no information is given as to which subset corresponds to ABSs and which corresponds to non-ABSs. In LTE, a serving cell may signal to a served UE an ABS pattern, which may be explicit or implicit.

In some embodiments, sub-frame type identification unit 54 identifies the type of the received sub-frames by testing three hypotheses denoted $\overline{P0}$, $\overline{P1}$, and $\overline{P2}$, typically over the period of a single ABS pattern. For the hypotheses $\overline{P0}$ and $\overline{P1}$, transmission of ABSs is assumed to be used. Hypothesis $\overline{P0}$ assumes that the '1' bits of the pattern correspond to ABSs and the '0' bits correspond to non-ABSs. Hypothesis $\overline{P1}$ assumes that the '0' bits of the pattern correspond to ABSs and the '1' bits correspond to non-ABSs. The third hypothesis, $\overline{P2}$, assumes that no transmission of ABSs is used.

In an example embodiment, unit 54 first estimates the noise level $\sigma^2(n)$, n=1 ... N, for each sub-frame n over a pattern period comprising N sub-frames. Let P0(n) and P1(n) denote the $n^{th}$ bit of the respective ABS pattern, wherein a '1' indicates an ABS and a '0' indicates a non-ABS. Therefore, the summation over the terms P0(n)·$\sigma^2$(n), and P1(n)·$\sigma^2$(n), n=1 ... N, evaluates the total interference noise under the assumption that the respective hypothesis $\overline{P0}$ or $\overline{P1}$ is correct.

Unit 54 calculates a noise ratio $\Lambda$ according to the following equation:

$$\Lambda = 10 \cdot \log_{10} \left\{ \frac{\sum_{n=1}^{N} P0(n) \cdot \sigma^2(n)}{\sum_{n=1}^{N} P1(n) \cdot \sigma^2(n)} \right\} \quad \text{Equation 1}$$

When the value of the noise ratio $\Lambda$ exceeds a positive threshold (denoted Thr), the numerator is significantly larger than the denominator, and the hypothesis $\overline{P1}$ is considered the most probable (among the three hypotheses). When $\Lambda$ falls below –Thr the probability that $\overline{P0}$ is the correct hypothesis is the highest. The $\overline{P2}$ hypothesis is the most probable of the three when the absolute value of the noise ratio is smaller than Thr.

In an embodiment, unit 54 selects one of the three hypotheses $\overline{P0}$, $\overline{P1}$, or $\overline{P2}$, according to the following decision rule, wherein P denotes the selected hypothesis, and Thr is a predefined or adaptive positive threshold:

$$\hat{P} = \begin{cases} \overline{P0}; & \Lambda < -Thr \\ \overline{P2}; & |\Lambda| < Thr \\ \overline{P1} & Thr < \Lambda \end{cases} \quad \text{Equation 2}$$

In some embodiments, the noise ratio is calculated over a number of M pattern periods. In such embodiments, unit 54 calculates M noise ratio values $\Lambda(m)$, m=1 ... M, using, for example, Equation 1, wherein m denotes the $m^{th}$ pattern period. In these embodiments the sum $\Sigma_{m=1}^{M}\Lambda(m)$ replaces $\Lambda$ in the decision rule of Equation 2, and the decision threshold in Equation 2 is replaced with M·Thr.

When the outcome of the decision rule in Equation 2 equals $\overline{P0}$ or $\overline{P1}$, unit 54 identifies the ABSs according to locations of the '1' bits in the respective pattern P0 or P1.

In some embodiments, network 20 enables the periodic transmission of ABS sub-frames according to some ABS pattern, but UE 24 is unaware of the ABS pattern in use. In such embodiments, unit 54 estimates the ABS pattern using long term averaging techniques as described below.

In an embodiment, unit 54 estimates the noise level for each sub-frame n in the ABS pattern, by averaging over M pattern periods:

$$\sigma^2(n) = \sum_{m=1}^{M} \sigma'^2(m, n), \quad n = 1 \ldots N \quad \text{Equation 3}$$

In Equation 3, $\sigma'^2(m,n)$ denotes the noise level in the $n^{th}$ sub-frame of the $m^{th}$ pattern period. Unit 54 may use any suitable method for selecting the M pattern periods participating in Equation 3. For example, in an embodiment, unit 54 applies Equation 3 over M consecutive pattern periods. Alternatively, unit 54 excludes from the calculations outlier pattern periods in which the noise level is significantly higher or lower than in the majority of the pattern periods.

Unit 54 then calculates a sub-frame ratio R(n) given by:

$$R(n) = \frac{\sigma^2(n)}{\max_{n=1 \ldots N} \sigma^2(n)}, \quad n = 1 \ldots N \quad \text{Equation 4}$$

and estimates the bits $\hat{P}(n)$ of the underlying ABS pattern using the following decision rule, which is applied per sub-frame in the pattern period:

$$\hat{P}(n) = \begin{cases} 1 & Thr < R(n) \\ 0 & \text{otherwise} \end{cases}, \quad n = 1 \ldots N \quad \text{Equation 5}$$

In Equation 5, 0<Thr<1 is a predefined (e.g., 0.5) or adaptive threshold. Based on the estimated bits $\hat{P}(n)$ of the ABS pattern, unit 54 classifies the sub-frames to the sub-frame types ABSs and non-ABSs.

To test if the transmission of ABSs is disabled, unit 54 calculates a ratio R2 given in Equation 6.

$$R_2 = \frac{\min_{n=1 \ldots N} \sigma^2(n)}{\max_{n=1 \ldots N} \sigma^2(n)} \quad \text{Equation 6}$$

Unit 54 then compares R2 to a threshold that is close to (but still below) unity, such as, for example, 0.95. If in this example R2>0.95, the noise level among all the sub-frames is similar, and therefore unit 54 can decide that the network is configured with no ABSs transmissions with high confidence.

The techniques disclosed in this section are applicable for use, for example, at operation 140 in the method of FIG. 3 above.

In some embodiments, the serving cell transmits over the downlink channel reference signals, such as, for example, pilot signals that do not carry data or signaling. The reference signals are used for synchronization, channel estimation and other measurements. Pilot signals that are transmitted during ABSs typically comprise lower interference noise than in other sub-frames.

In an embodiment, channel estimation CE unit 60 estimates the channel response by averaging the received pilot signals over multiple sub-frames. In the disclosed techniques, CE unit 60 uses the sub-frame classification information provided by unit 54 to improve the channel estimation.

In an example embodiment, unit 54 identifies the type of the sub-frames by detecting the underlying transmitted ABS pattern, for example, using at least one of the decision rules described in Equations 2 and 5 above. Additionally or alternatively, unit 54 identifies the sub-frames type using any other suitable method.

In some embodiments, when ABS pattern is in use, unit 60 estimates the channel response individually per each sub-frame. Otherwise, unit 60 estimates the channel response while permitting averaging pilot signals over multiple sub-frames.

In an embodiment, unit 60 estimates the channel response by averaging pilot signals only over sub-frames that are identified as ABSs. This method improves the estimation since highly interfered sub-frames (e.g., non-ABSs) may distort the estimation.

In some embodiments, UE 24 has no knowledge of the underlying transmitted ABS pattern. In these embodiments unit 60 estimates the channel response by averaging the pilot signals over all the sub-frames of the pattern period.

In other embodiments, unit 54 additionally estimates the SNR value per each sub-frame and an average SNR over the ABSs, and delivers the SNRs to unit 60. When the average SNR of the ABSs exceeds a predefined threshold, the ABSs are considered reliable, and the channel estimation improves by averaging the pilot signals only over the ABSs. Otherwise unit 60 averages the pilot signals over all the sub-frames of the pattern period. This method improves the channel estimation at low SNRs, in an embodiment, when averaging over a larger number of sub-frames produces more accurate estimations than averaging only over the ABSs.

In some of the above described embodiments, unit 60 includes some sub-frames (e.g., ABSs having high average SNR) in the channel estimation, and excludes other sub-frames. Such estimation can be viewed as hard estimation since it assigns unity or zero weights to respective sub-frames that participate or not in the estimation.

In alternative embodiments, unit 60 performs soft channel estimation by assigning sub-frames with soft weights that may differ from unity and zero. For example, in an embodiment, unit 60 calculates a weighted average of the pilot signals over the sub-frames of the entire pattern period, while assigning higher weights to ABSs than to non-ABSs. Alternatively or additionally, unit 60 sets a weight value per sub-frame based on the respective estimated sub-frame SNR, so that sub-frames having higher SNR are assigned higher weights.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
    in a mobile communication terminal, receiving signals from a base station in a sequence of time frames;
    based on the received signals, determining in the terminal a classification of the time frames into first and second types, such that a level of interference in the time frames of the first type is lower than the level of interference in the time frames of the second type; and
    tracking one or more of a gain, a frequency and a timing of the received signals based on the time frames of the first type and not on the time frames of the second type.

2. The method according to claim 1, wherein receiving the signals comprises receiving signaling that defines time-frame patterns corresponding to the first and second types, wherein determining the classification comprises identifying which of the time-frame patterns comprises the time frames of the first type and which of the time-frame patterns comprises the time frames of the second type.

3. The method according to claim 2, wherein determining the classification comprises identifying that none of the patterns comprises the time frames of the first or second type.

4. The method according to claim 1, wherein the time frames alternate between the first type and the second type in a periodic pattern, and wherein determining the classification comprises averaging noise in the received signals over multiple periods of the periodic pattern, and determining the classification based on the averaged noise.

5. The method according to claim 1, comprising:
    upon successfully determining the classification, estimating a response of a channel carrying the signals by averaging the signals over multiple time frames;
    upon failing to determine the classification, estimating the response of the channel individually per time frame; and
    decoding the signals using the estimated response of the channel.

6. The method according to claim 1, wherein determining the classification further comprises determining that the time frames cannot be classified into the first and second types, and wherein tracking the one or more of the gain, the frequency and the timing is not based on the classification.

7. Apparatus, comprising:
    a receiver, which is configured to receive downlink signals from a base station in a sequence of time frames; and
    processing circuitry, which is configured to determine a classification of the time frames into first and second types based on the received signals, such that a level of interference in the time frames of the first type is lower than the level of interference in the time frames of the second type, and to track one or more of a gain, a frequency and a timing of the received signals based on the time frames of the first type and not on the time frames of the second type.

8. The apparatus according to claim 7, wherein the processing circuitry is configured to receive signaling that defines time-frame patterns corresponding to the first and second types, and to identify which of the time-frame patterns comprises the time frames of the first type and which of the time-frame patterns comprises the time frames of the second type.

9. The apparatus according to claim 8, wherein the processing circuitry is configured to identify that none of the patterns comprises the time frames of the first or second type.

10. The apparatus according to claim 7, wherein the time frames alternate between the first type and the second type in a periodic pattern, and wherein the processing circuitry is configured to determine the classification by averaging noise in the received signals over multiple periods of the periodic pattern and determining the classification based on the averaged noise.

11. The apparatus according to claim 7, wherein the processing circuitry is configured to decode the signals by:
    upon successfully determining the classification, estimating a response of a channel carrying the signals by averaging the signals over multiple time frames;

upon failing to determine the classification, estimating the response of the channel individually per time frame; and decoding the signals using the estimated response of the channel.

12. The apparatus according to claim 7, wherein the processing circuitry is configured to determine that the time frames cannot be classified into the first and second types, and to track the one or more of the gain, the frequency and the timing not based on the classification.

13. A mobile communication terminal comprising the apparatus of claim 7.

14. A chipset for processing signals in a mobile communication terminal, comprising the apparatus of claim 7.

* * * * *